(12) United States Patent
Karasawa (10) Patent No.: US 7,249,941 B2
(45) Date of Patent: Jul. 31, 2007

(54) DEVICE FOR MANUFACTURING PLASTIC LENS

(75) Inventor: Isao Karasawa, Minowa Machi (JP)

(73) Assignee: Seiko Epson Corporation, Tokyo (JP)

( * ) Notice: Subject to any disclaimer, the term of this patent is extended or adjusted under 35 U.S.C. 154(b) by 228 days.

(21) Appl. No.: 10/944,424

(22) Filed: Sep. 20, 2004

(65) Prior Publication Data

US 2005/0112225 A1    May 26, 2005

(30) Foreign Application Priority Data

Sep. 18, 2003    (JP) .............................. 2003-326304

(51) Int. Cl.
*B29C 35/08*    (2006.01)
*B29D 11/00*    (2006.01)

(52) U.S. Cl. .................. 425/174.4; 425/135; 425/143; 425/808; 264/1.36; 264/1.38

(58) Field of Classification Search ................ 425/135, 425/143, 162, 174.4, 808; 264/1.36, 1.38
See application file for complete search history.

(56) References Cited

U.S. PATENT DOCUMENTS

| | | | | |
|---|---|---|---|---|
| 4,919,850 A | * | 4/1990 | Blum et al. | 264/1.38 |
| 5,269,978 A | * | 12/1993 | Umetsu et al. | 264/1.36 |
| 6,419,873 B1 | * | 7/2002 | Buazza et al. | 264/496 |
| 6,439,870 B1 | * | 8/2002 | Marceau et al. | 425/111 |

FOREIGN PATENT DOCUMENTS

| | | |
|---|---|---|
| JP | 01-308610 A | 12/1989 |
| JP | 05-084755 | 4/1993 |
| JP | 05/084755 A | 4/1993 |
| JP | 05-138658 A | 6/1993 |
| JP | 05-329873 | 12/1993 |
| JP | 05-329873 A | 12/1993 |
| JP | 07-290587 | 11/1995 |
| JP | 07-290587 A | 11/1995 |
| JP | 10-249953 | 9/1998 |
| JP | 10-249953 A | 9/1998 |
| JP | 2003-535360 A | 11/2003 |
| WO | WO 01/91994 A1 | 12/2001 |

OTHER PUBLICATIONS

English Abstracts and computer translation for JP 10-249953, Sep. 22, 1998.*

* cited by examiner

Primary Examiner—Yogendra N. Gupta
Assistant Examiner—Dimple Bodawala
(74) Attorney, Agent, or Firm—Sughrue Mion, PLLC (57) ABSTRACT

A rotation table transfers a casting mold M injected with a plastic composition in a circular manner. An active-energy-ray irradiating area is provided to irradiate active energy rays onto the casting mold M in a predetermined angular range when the casting mold M is loaded on the rotation table and the rotation table is rotated once. A servo motor drives the rotation axis of the rotation table. A controller controls the servo motor such that the active energy rays from an ultraviolet lamp are irradiated onto the casting mold M in the active-energy-ray irradiating area for a required time. When the rotation table is intermittently rotated by 60° degrees in a counterclockwise direction, the casting mold M supplied from a supplying/removing area is irradiated by the ultraviolet rays in the active-energy-ray irradiating area, gradually cooled in the cooling area, and returned to the supplying/removing area again and is removed.

16 Claims, 4 Drawing Sheets

DEVICE FOR MANUFACTURING PLASTIC LENS

This application is based on a Japanese Patent Application No. 2003-326304 filed on Sep. 18, 2003, the disclosure of which is incorporated herein by reference in its entirety.

BACKGROUND OF THE INVENTION

1. Technical Field of the Invention

The present invention broadly relates to a device for manufacturing a plastic lens. More particularly, the present invention relates to a device manufacturing the plastic lens by a casting method that uses active energy rays.

2. Description of Related Art

In manufacturing a plastic lens, a casting method is widely used. In the casting method, a plastic lens forming composition is injected into a casting mold. Then, the casting mold injected with the plastic composition is heated or irradiated by active energy rays such as ultraviolet rays, so that the plastic composition is polymerized and hardened. Subsequently, the casting mold is removed, whereby the plastic lens is obtained.

The method for curing (polymerizing and hardening) the lens forming composition by irradiating the active energy rays (an active-energy-ray irradiation polymerization method) completes the process of polymerization in a short period of time. In other words, polymerizing by irradiating the lens forming composition with active energy rays helps reduce the manufacture time resulting in faster delivery of the plastic lens. In particular, this method is suitable for producing a custom plastic lens or for producing a number of different types of plastic lenses in small quantities of each.

As disclosed in Japanese Unexamined Patent Application Publication No. 10-249953, a widely used method for manufacturing a plastic lens is the active-energy-ray irradiation polymerization method. In this method, ultraviolet rays are irradiated onto both surfaces or both faces of the casting mold injected with the plastic composition to polymerize or cure this injected composition, while the casting mold is transferred, by a transferring conveyer, into an ultraviolet irradiation furnace with an ultraviolet irradiation device disposed therein.

In the manufacturing method in which the composition is polymerized by the ultraviolet irradiation device while the casting mold is transferred by the transferring conveyer, a so-called consecutive ultraviolet hardening device is used. In this consecutive ultraviolet hardening device, the transferring conveyer is consecutively operated.

Figure 5:
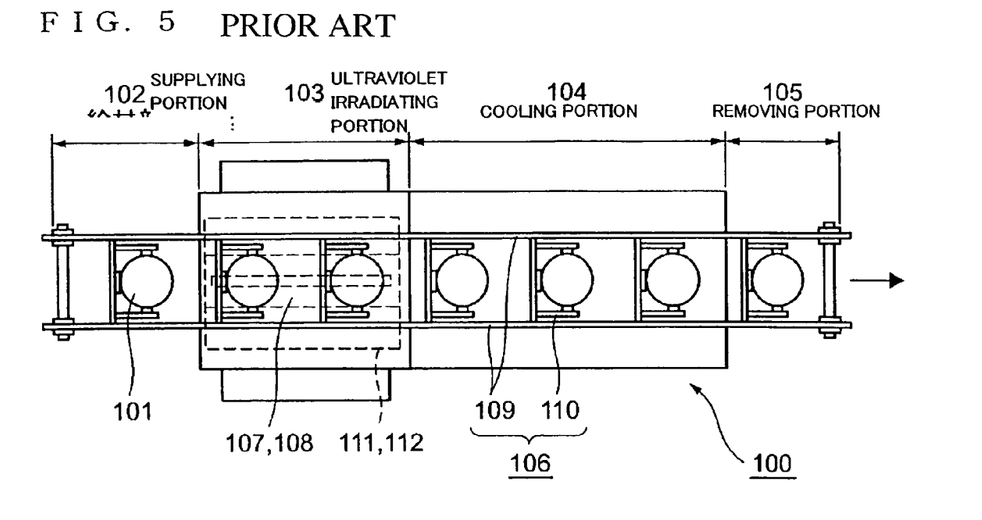
FIG. 5 is a schematic view of a conventional consecutive ultraviolet hardening device.
Figure 6:
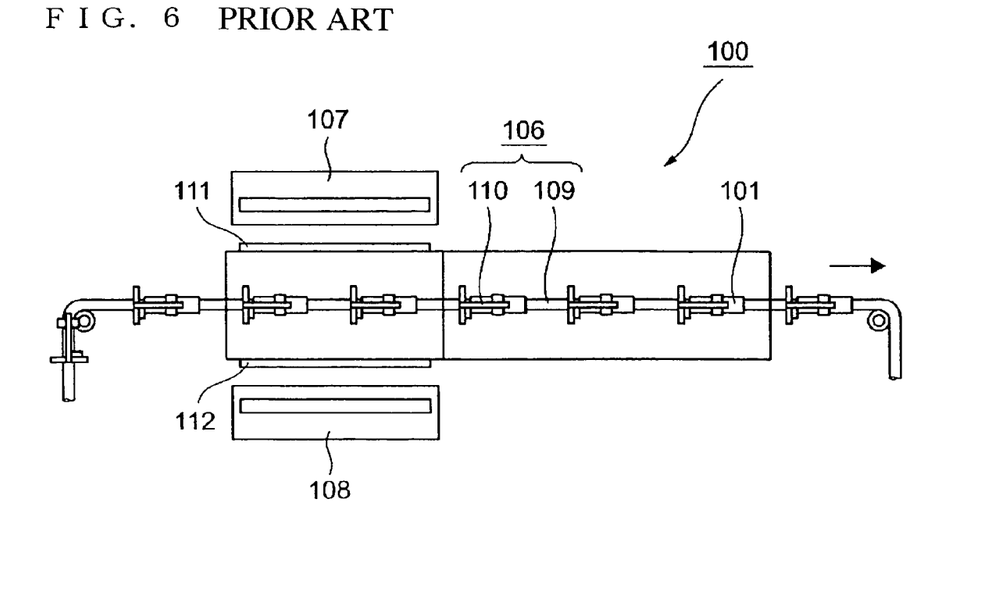
FIG. 6 is a schematic cross-sectional view of the conventional consecutive ultraviolet hardening device.

FIGS. 5 and 6 are a front view and a cross-sectional view showing the basic structure of the consecutive ultraviolet hardening device. In the consecutive ultraviolet hardening device 100, there is a supplying portion 102 for supplying the casting mold 101 to be polymerized, an ultraviolet irradiating portion 103 for irradiating the ultraviolet rays, a cooling portion 104 for cooling the casting mold 101 and a removing portion 105 for removing the polymerized casting mold 101. These portions 102-105 are arranged in linear fashion, for example, in a straight line as illustrated in FIGS. 5 and 6.

In addition, the consecutive ultraviolet hardening device 100 includes a transferring conveyer 106 as illustrated in FIGS. 5 and 6. The transferring conveyer 106 has a metallic transferring chain or a metallic belt 109 and a work chuck 110 (described in further detail below). As illustrated in FIGS. 5 and 6, this metallic transferring chain 109 is arranged on both sides of the casting mold 101 to be polymerized, as is known in the art, such that the ultraviolet lamps 107 and 108 of the ultraviolet irradiating portion 103 emit ultraviolet rays onto both surfaces of the casting mold 101. In particular, the ultraviolet rays are emitted onto the casting mold 101 via irradiating windows 111 and 112 illustrated in FIGS. 5 and 6. These irradiating windows are made of quartz glass. Alternatively, if the ultraviolet rays are emitted on only one surface or one face of the casting mold 101, the casting mold 101 will have to cope with the ultraviolet irradiation for a long period of time.

The transferring conveyer 106 also includes a metallic work chuck 110 that is integrally attached to the transferring chain 109. The work chuck 110 is constructed in a way which permits the casting mold 101 to be removably attached to the work chuck 110. The casting mold 101 is placed and held in the work chuck 110. The casting mold 101 held in the work chuck is then transferred on the consecutive ultraviolet hardening device from the supplying portion 102 up to the removing portion 105 in a direction illustrated by an arrow in FIGS. 5 and 6. During this transfer, the polymerization of the lens forming composition is performed.

However, in the method of manufacturing the plastic lens using the consecutive ultraviolet hardening device, since the hardening device is arranged in a linear fashion, the device is bulky. Besides, since the supplying portion and the removing portion of the casting mold are spaced apart from each other, an operator must travel from the supplying portion to the removing portion to obtain the cured lens forming composition. This traveling results in a time loss. In addition, since the casting mold with the injected plastic composition is transferred by the transferring conveyer and is gradually irradiated by the ultraviolet rays, it is necessary to carefully manage the ultraviolet irradiation energy. Further, there is a problem of a decrease with time in the irradiation intensity of the ultraviolet rays. In particular, the quartz glasses of irradiating windows 111 and 112 are polluted due to dust particles from the transferring conveyer 106 (in particular, the transferring chain 109), which results in decreasing the intensity of irradiation of the ultraviolet rays reaching the casting mold 101.

SUMMARY OF THE INVENTION

Therefore, it is an aspect of the present invention to provide a compact device for manufacturing a plastic lens having a high operational efficiency.

An illustrative, non-limiting embodiment of the present invention may overcome the above disadvantages and other disadvantages not described above. The present invention is not necessarily required to overcome any of the disadvantages described above, and the illustrative, non-limiting embodiment of the present invention may not overcome any of the problems described above. The appended claims should be consulted to ascertain the true scope of the invention.

In order to solve the above-described problems, according to the illustrative, non-limiting embodiment of the present invention, there is provided a device for manufacturing a plastic lens by irradiating active energy rays onto a casting mold injected with a plastic composition to polymerize the plastic composition. The device has a rotary table for transferring a number of casting molds in a circular manner; a driving means for rotatively driving a rotation axis of the rotary table; an irradiating portion irradiating the active energy rays in a predetermined angular range onto one or more casting molds when the casting molds loaded on the rotary table are rotated once, and a control means for controlling the driving means, to irradiate the active energy rays from the irradiating portion onto the casting molds for a predetermined period of time.

According to the above-mentioned exemplary device for manufacturing a plastic lens, it is possible to manufacture the plastic lens when the casting mold injected with the plastic composition loaded on the rotary table is rotated once. This exemplary device has a compact size and an excellent spatial efficiency. Further, since it becomes possible to set the supplying portion and the removing portion of the casting mold at the same position, it is possible to reduce the operator's traveling time from the supply portion to the removing portion. In addition, the exemplary device for manufacturing the plastic lens has a high operational efficiency, where a decrease of the intensity of irradiation reaching the casting mold due to the dust particles from the rotary table, is prevented.

Further, the device for manufacturing a plastic lens according to the present invention has a supplying/removing portion for supplying and removing the casting molds to and from the rotary table, a first temperature adjusting portion for controlling the temperature of irradiating portion, a cooling portion for gradually cooling the casting mold, and a second temperature adjusting portion for controlling the temperature of the cooling portion. In this exemplary device the supplying/removing portion, the irradiating portion and the cooling portion are sequentially arranged in a circular fashion in a direction of the rotation of the rotation axis of the rotary table in the vicinity of the rotation axis.

According to the above-mentioned device, hot air is blown on the casting mold. The temperature of the hot air is adjusted by the respective temperature adjusting portions. As a result, it is possible to prevent yield productivity from being lowered due to the removal or separation of the plastic composition injected into the casting mold from the casting mold in the casting, lens forming process.

Further, in this device, the control means controls the driving means, intermittently rotating the rotary table at a cycle time. The control means secures a predetermined stop time by controlling the driving means to execute a predetermined amount of rotation. The predetermined amount of rotation is obtained by dividing one rotation of the rotary table into a predetermined number.

According to the above-mentioned device, by controlling the control means such that the rotary table is rotated at the predetermined rotation amount which is obtained by dividing one rotation of the rotation axis into the predetermined number, and the desired cycle time, it is possible to manufacture plastic lenses corresponding to various plastic compositions. In addition, in the irradiating portion, the active energy rays are irradiated when the casting mold injected with the plastic composition injected is stationed or stopped, such that it is possible to obtain the plastic lens having a stable polymer quality.

Further, the device according to illustrative, non-limiting embodiment of the present invention further comprises separating means for separating atmospheres formed in the supplying/removing portion, the irradiating portion and the cooling portion, when the rotation of the rotary table is stopped.

Accordingly, by forming isolated areas or chambers surrounded by the separating means, it is possible to suppress at a minimum the leakage of the active energy rays, such as ultraviolet rays, to be irradiated onto the casting mold injected with the plastic composition or leakage of the hot air the temperature of which is controlled by the respective temperature adjusting portions. As a result, it is possible to obtain the plastic lens having the stable polymer quality. At the same time, when supplying or removing the casting mold, it is possible to shield the operator from the diffusively reflected ultraviolet rays and/or the hot air.

Further, in this device, the irradiating portion irradiates ultraviolet rays as the active energy rays using an ultraviolet lamp.

According to the above-mentioned device, the active energy rays to be irradiated onto the casting mold injected with the plastic composition are the ultraviolet rays irradiated from the ultraviolet lamp. As a result, it is possible to provide a device for manufacturing a plastic lens in which actions such as temperature adjustment are easily made.

Further, in the exemplary device, in the stop position of the rotary table, the ultraviolet lamp is positioned by having an axis line of the ultraviolet lamp approximately intersect a center of the casting mold.

Accordingly, the ultraviolet rays are uniformly irradiated onto the casting mold from the center at the time of intermittent stop of the rotary table. Thus, it is possible to obtain the plastic lens having the polymer quality with no inside distortion.

Further, in the device for manufacturing a plastic lens according to the exemplary, non-limiting embodiment of the present invention, the irradiating portion has an irradiation area having a size sufficient to stop the casting mold on the rotary table in the irradiation area at least twice.

Accordingly, the ultraviolet rays are irradiated onto the casting mold a number of times in different directions. Thus, it is possible to obtain the plastic lens having the polymer quality with no inside distortion.

Further, in the device according to the exemplary embodiment of the present invention, the irradiating portion has at least a pair of active-energy-ray lamps at upper and lower sides of the rotary table, with the rotary table interposed therebetween. The rotary table has a transmitting member in at least one load position of the casting mold for transmitting the active energy rays irradiated from the active-energy-ray lamp arranged at the lower side.

Accordingly, the ultraviolet rays are irradiated from the upper and lower sides of the casting mold. Thus, it is possible to manufacture the plastic lens having the polymer quality with no inside distortion at a short time.

Further, in this exemplary device, the plastic composition is a plastic lens forming composition made of two or more polymer compounds. Thus, it is possible to obtain the plastic lens having the stable polymer quality using the active energy rays.

BRIEF DESCRIPTION OF THE DRAWINGS

The present invention will now be described in detail by describing an illustrative, non-limiting embodiment thereof with reference to the accompanying drawings. In the drawings, the same reference characters denote the same elements.

DETAILED DESCRIPTION OF AN ILLUSTRATIVE NON-LIMITING EMBODIMENT OF THE PRESENT INVENTION

The present invention will now be described in detail by describing an illustrative, non-limiting embodiment thereof with reference to the accompanying drawings. In the drawings, the same reference characters denote the same elements.

Figure 1:
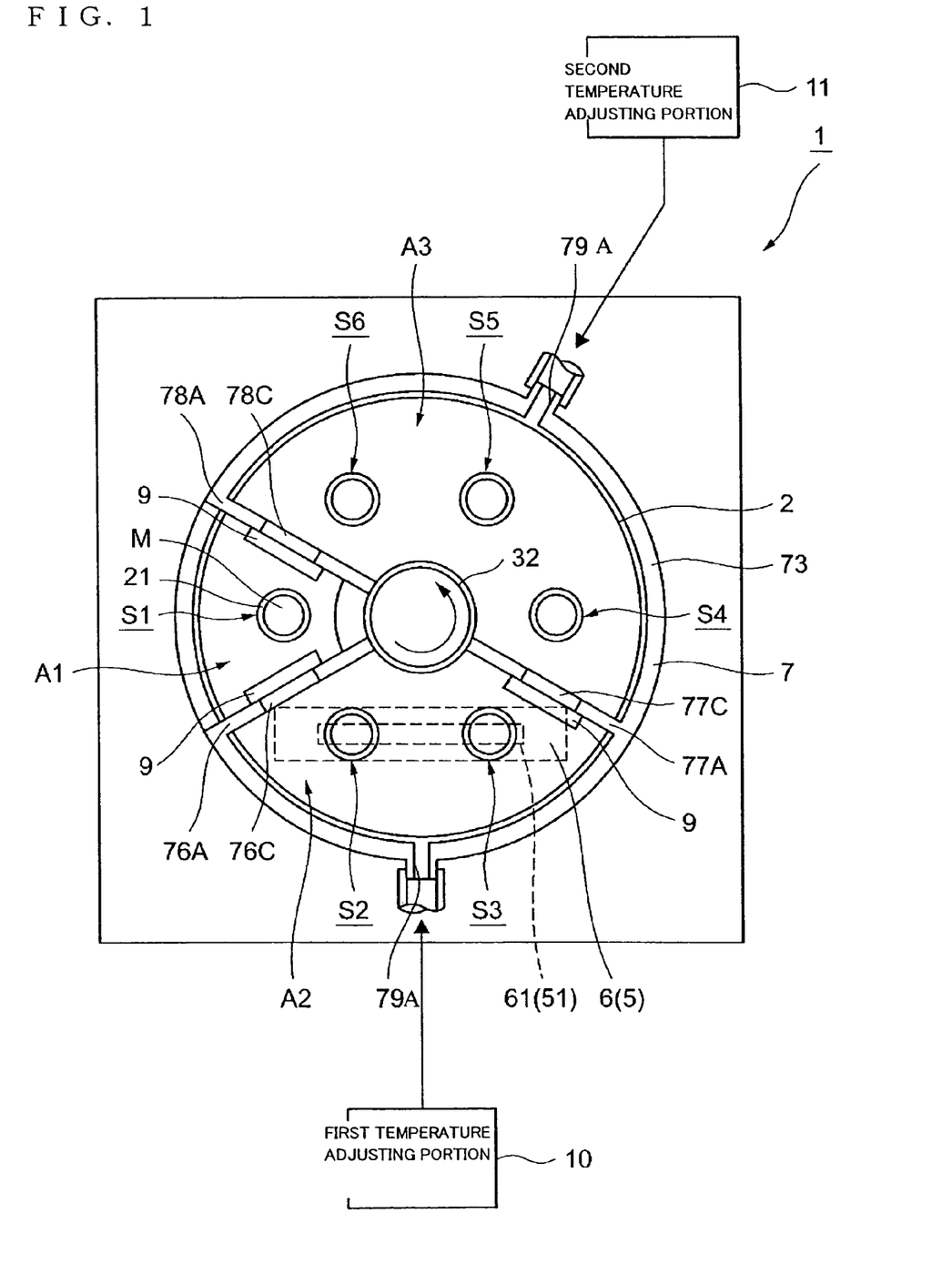
FIG. 1 is a schematic cross-sectional view showing a device for manufacturing a plastic lens according to an illustrative, non-limiting embodiment of the present invention.
Figure 2:
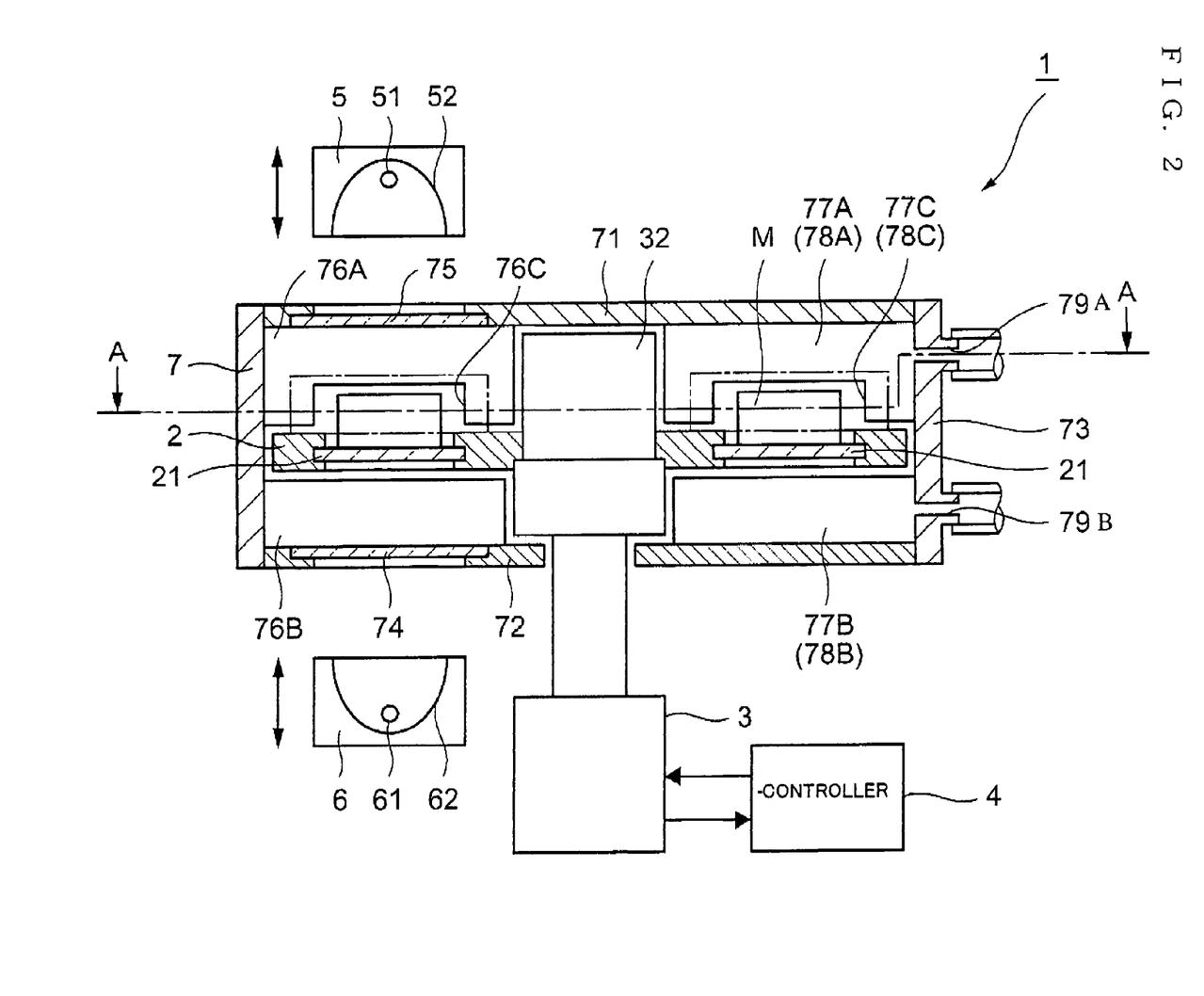
FIG. 2 is a schematic cross-sectional side view showing an exemplary construction of the device for manufacturing the plastic lens according to the illustrative, non-limiting embodiment.
Figure 3:
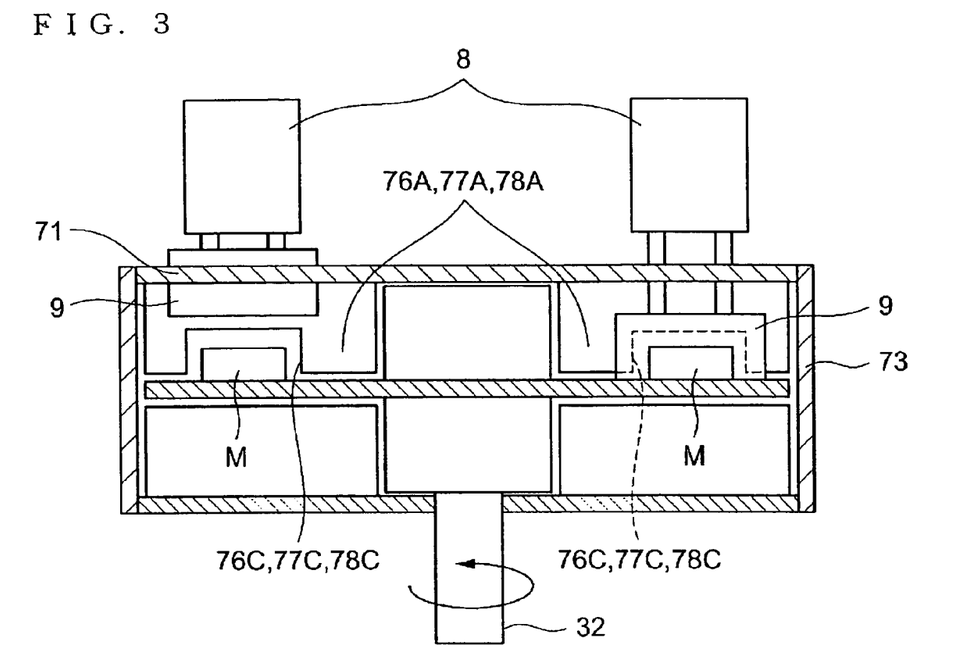
FIG. 3 is a schematic cross-sectional view of a shutter portion of the device for manufacturing the plastic lens according to the exemplary embodiment.
Figure 4:
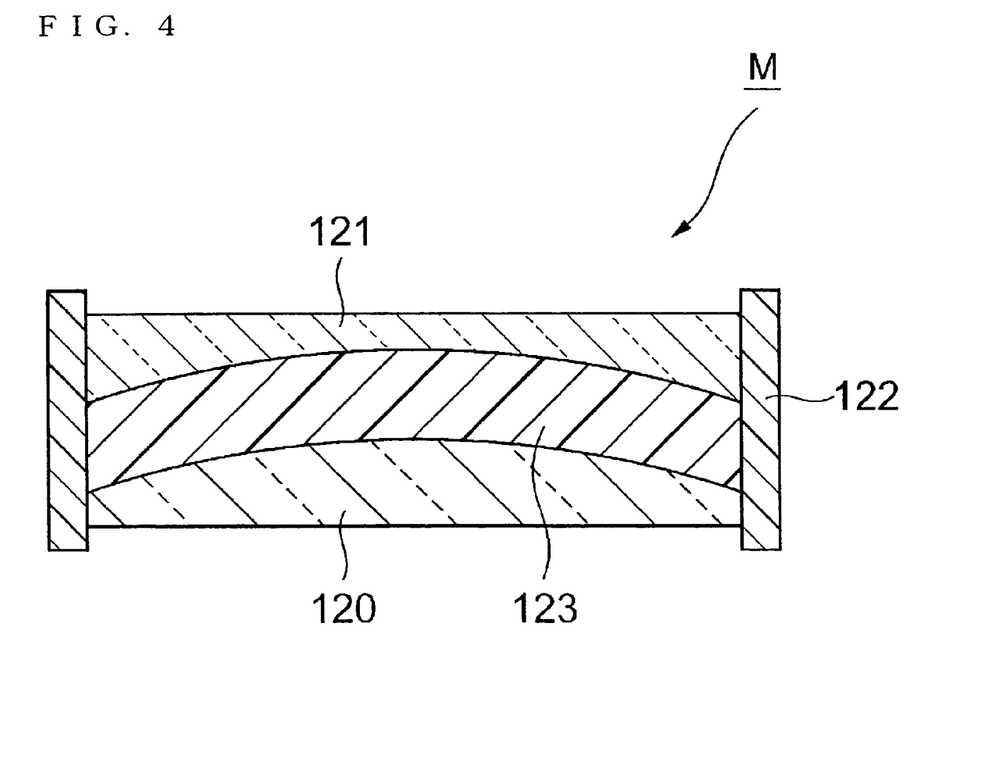
FIG. 4 is a cross-sectional view illustrating a casting mold according to the exemplary, non-limiting embodiment of the present invention.

FIG. 1 is a schematic cross-sectional view illustrating an exemplary construction of a device for manufacturing a plastic lens according to an embodiment of the present invention. Further, FIG. 2 is a schematic cross-sectional side view of the exemplary construction of this device. FIG. 1 shows a cross section taken along the line A-A of this device illustrated in FIG. 2. FIG. 3 is a schematic cross-sectional view of a shutter portion of the device for manufacturing the plastic lens according to the exemplary embodiment of the present invention, and FIG. 4 is a cross-sectional view illustrating a casting mold according to the exemplary embodiment of the present invention.

First, a structure of a device for manufacturing a plastic lens in which a polymer process is performed onto a casting mold M ejected with a plastic lens forming composition will be described with reference to FIGS. 1 and 2.

In FIGS. 1 and 2, an ultraviolet hardening device 1 comprises a rotary table 2 for transferring the casting mold M injected with the plastic composition in a circular manner, a servo motor 3 (shown in FIG. 2) as driving means for revolving or driving in a circular motion the rotary table 2, a controller 4 (shown in FIG. 2) as a control means for controlling the servo motor 3, two ultraviolet irradiating devices 5 and 6 for irradiating ultraviolet rays onto the casting mold M, and a cover 7.

The rotary table 2 is a disk-shaped rotary table. The rotary table 2 has circular through holes passing through the rotary table 2 in a perpendicular direction at divided positions every 60 degrees with respect to a rotation axis line in a concentric circle having a predetermined radius from the rotation center of the rotary table 2. In the respective six through holes, a glass plate 21 is engaged as a transmitting member made of a transparent glass through which the ultraviolet rays pass. The casting mold M, described in greater detail below, is loaded on the glass plate 21.

The servo motor 3 is connected to the rotation axis 32 that is fixed to the rotary table 2, to drive the rotary table 2. An incremental encoder (not shown) is directly connected to the rotation axis 32 of the servo motor 3, for detecting a rotation angle of the servo motor. Moreover, the driving means and the control means of the rotary table 2 are not limited to the servo motor 3 and the controller 4 described in the present embodiment. Other means capable of intermittently rotating the rotary table 2 by a predetermined amount may be used.

The controller 4 is a control circuit for outputting a rotation control signal to the servo motor 3. The controller 4 outputs the rotation control signal to the servo motor 3 which is directly connected or is connected via a decelerator (not shown) to the rotary table 2, and drives the rotary table 2 by 60 degrees in the counterclockwise direction at a predetermined time interval. The time interval of the rotation is set to a desirable or required time. In other words, this desirable time is determined from a processing time of every intermittent rotation which is determined from a total time (a cycle time) of a predetermined rotation driving time and a predetermined stop time.

In this exemplary embodiment, the rotary table 2 is driven by 60 degrees in the counterclockwise direction, and stop positions of the rotary table 2 are denoted by S1 to S6 (S means a stage), as illustrated in FIG. 1.

The ultraviolet irradiation devices 5 and 6 comprise longitudinal axis-shaped ultraviolet lamps 51 and 61, and reflectors 52 and 62. Each reflector has an approximately semicircular arc surface so as to uniformly irradiate the ultraviolet rays onto the casting mold M loaded on the glass plate 21 of the rotary table 2. The ultraviolet lamps 51 and 61 are respectively arranged above and below the rotary table. Further, the ultraviolet lamps 51 and 61 are arranged parallel to the rotary table 2 so as to overlap a straight line connecting positions S2 and S3 at which the glass plate 21 of the rotary table 2 (that is, the casting mold M) stops. The ultraviolet lamps simultaneously irradiate the ultraviolet rays onto the positions S2 and S3. For example, mercury lamps, metal halide lamps, xenon lamps or the like may be used as the ultraviolet lamps 51 and 61.

The ultraviolet lamps 51 and 61 have a light adjusting function to secure the same intensity of irradiation even when the intensity of irradiation is lowered due to a deterioration of the device caused by aging. When even the light adjusting function cannot secure a sufficient intensity of irradiation, the irradiation distance adjusting means may be used for moving the ultraviolet irradiation devices 5 and 6 in a direction illustrated by an arrow in FIG. 2. The irradiation distance adjusting means is provided to obtain a predetermined amount of light by changing a distance from the ultraviolet lamps 51 and 61 to the casting mold M (the irradiation distance of the lamp).

FIG. 2 further illustrates the cover 7 having an upper surface case portion 71, a lower surface case portion 72 and an outer circumferential side surface portion 73, which are integrally formed. In the upper surface case portion 71 and the lower surface case portion 72, irradiation windows 74 and 75 are formed using quartz glasses (transparent glasses) for example. The size of each quartz glass allows for irradiating the ultraviolet rays to two casting molds M which are respectively loaded on the glass plates 21 disposed at the positions S2 and S3 at the time of stopping of the rotary table 2.

Further, in the upper surface case portion 71 and the lower surface case portion 72, spacers 76A to 78A and spacers 76B to 78B (shown in FIG. 2) are respectively formed at three positions between S1 and S2, S3 and S4, and S6 and S1 at which the glass plates 21 stop. These spacers 76A to 78A and 76B to 78B are formed such that the outer circumference side of the rotary table 2 is fixed to the outer circumferential side surface portion 73, the upper surface case portion 71 and the lower surface case portion 72, and the inner circumference side of the rotary table 2 has a size sufficient for rotating the rotation axis 32. That is, the size of the inner circumference side is sufficient for rotating the rotary table 2.

In the S1 portion at which the glass plate 21 stops, is the supplying/removing portion where the casting mold M is supplied and removed. The upper surface case portion 71 in the S1 portion is cut in the range interposed between the spacer 76A and the spacer 78A and the outer circumferential side surface portion 73 from the upper surface case portion 71 to the rotary table 2 also in the range interposed between the spacer 76A and the spacer 78A.

Further, in the spacers 76A to 78A provided in the upper surface case portion 71, concaved cut portions 76C to 78C are formed in the rotary table 2 side. When the rotary table 2 rotates, the casting mold M pass through these concaved cut portions 76C to 78C.

In these three cut portions 76C to 78C formed in the spacers 76A to 78A, as shown in a schematic cross-sectional view of a shutter portion of FIG. 3, the shutter 9 is provided. The shutter 9 moves up and down whenever the casting mold M passes through the cut portions 76C to 78C due to the rotation of the rotary table 2. The shutter 9 moves up and down by moving three shutter opening/closing cylinders 8 respectively provided on the upper portion of the upper surface case portion 71 of the cover 7 such that the concaved cut portions 76C to 78C formed in the spacers 76A to 78A are closed/opened. These cut portions 76C to 78C maintain a state in which the shutter 9 is closed, except for the time when the casting mold M passes through the spacers 76A to 78A due to the rotation of the rotary table 2. Moreover, in this exemplary embodiment, the shutter is described as a separating means of the respective processes, but the present invention is not limited to the shutter, other means can be used to separate the respective processes from each other.

When the shutter 9 is closed, an area between the spacers 76A and 78A is the supplying/removing area A1 in which the operator supplies and removes the casting mold M. Further, an area between the spacers 76A and 76B and the spacers 77A and 77B, and the outer circumferential side surface portion 73 is an active-energy-ray irradiating area A2 for irradiating the ultraviolet rays onto the casting mold M, and an area between the spacers 77A and 77B and the spacers 78A and 78B, and the outer circumferential side surface portion 73 is a cooling area A3 for gradually cooling the casting mold M. The areas A1 for supplying and removing the casting mold M, A2 for forming a chamber for emitting ultraviolet rays onto the casting mold M, and A3 for forming a cooling chamber, are illustrated in FIG. 1.

In the outer circumferential side surface portion 73 of the irradiating area A2 and the cooling area A3, supplying slots 79A and discharging slots 79B are respectively provided for distributing circulating air to maintain the respective areas at desired temperatures. In the respective supplying slots 79A, air is supplied from a heater to the active-energy-ray irradiating area A2 and the cooling area A3, respectively. The air circulated in the respective areas is discharged from the discharging slots 79B. The temperature of this air is controlled by the output from the first temperature adjusting portion 10 and the second temperature adjusting portion 11 illustrated in FIG. 1.

Next, the casting mold M injected with the plastic composition to be polymerized by the device for manufacturing the plastic lens according to the exemplary embodiment of the present invention will be described with reference to FIG. 4.

The casting mold M has two mold members 120 and 121 (hereinafter "molds"), which are made of glass. The two molds are fixed together to form an optical surface of the lens having a desired curved surface. The two molds are maintained at a predetermined gap, thereby forming a cavity for the lens forming composition 123. An adhesive tape 122 in which a silicon adhesive is coated on an inside of a biaxially stretched polyethylenetelephthalate film in the vicinities of the side surfaces of the circumferences of the molds 120 and 121 crosses over and winds around the two molds 120 and 121, so that the two molds 120 and 121 are fixed to each other.

In a cavity formed between the two fixed molds 120 and 121, the plastic composition 123, which is to be polymerized or cured by the ultraviolet rays, is injected using; for example, a syringe.

The injected plastic composition 123 is a plastic lens forming composition made of two or more polymer compounds. This plastic composition 123 has a single functional or multi-functional reactive group. The plastic composition 123 includes a compound having one or two or more radical polymerizable double bonds in molecules, for example, epoxydimethacrylate obtained by reacting bisphenol A diglycidylether with methacrylic acid, urethanedimethacrylate obtained by reacting nonabutyleneglycoldimethacrylate with phenylmethacrylate, isophoronediisocyanate and 2-hydroxypropylmethacrylate, 2,4,6-trimethyl-benzoyldiphenyl-phosphine-oxide, 2-hydroxy-4-methoxybenzophenone, tri-dodecylphosphate and photo-polymerization initiators.

After the device for manufacturing the plastic lens polymerizes or cures the casting mold M, the adhesive tape 122 is removed from the molds 120 and 121. Thereafter the two molds 120 and 121 are removed from the hardened plastic composition 123 (the formed plastic cast), and the casting of the plastic lens is completed.

Next, an operation of the device for manufacturing the plastic lens constructed according to the exemplary embodiment of the present invention will be described. Moreover, the formation and processing of one casting mold M supplied to this device will be described in every step.

To begin, in the position S1 at which supply and removal of the casting mold M is performed, the casting mold M is loaded onto the glass plate 21 arranged on the rotation table 2 by an operator. In other words, the operator supplied the casting mold M to the device. Next, the rotation table 2 rotates by 60 degrees in the counterclockwise direction by the servo motor 3, and the casting mold M loaded onto the glass plate 21 stops at the position S2.

Just before the start of the rotation of the rotation table 2, the shutter opening/closing cylinder 8 operates so as to raise the shutter 9. That is, the operation of the cylinder 8 opens the concaved cut portion 76C of the spacer 76A, and the casting mold M passes through the spacer 76A. Just after the casting mold M passes through the spacer 76A and the rotation of the rotation table 2 ends, the shutter opening/closing cylinder 8 operates so as to lower the shutter 9 thereby closing the concaved cut portion 76C of the spacer 76A.

Next, in the position S2, the casting mold M is irradiated by the ultraviolet rays having a first predetermined intensity of irradiation by two ultraviolet irradiating devices 5 and 6. At the same time, the casting mold M is maintained at a desired temperature by circulating air supplied from the supplying slot 79A formed in the outer circumferential side surface portion 73. The temperature of the air from the heater supplied using the supplying slot 79A is controlled by the output from the first temperature adjusting portion 10. Then, after a predetermined period of time lapses, similar to the previous step, the rotation table 2 rotates by 60 degrees again in a counterclockwise direction, and the casting mold M reaches and stops at the positions S3.

In the position S3, similar to the position S2, the casting mold M is irradiated upward and downward by the ultraviolet rays having a second predetermined intensity of irradiation from the two ultraviolet irradiating devices 5 and 6. The second ultraviolet irradiation is performed simultaneously with the ultraviolet irradiation onto the casting mold M at the position S2. At this time, the casting mold M at the position S3 is maintained at a desired temperature by supplying and circulating air, the temperature of which is controlled by the first temperature adjusting portion 10, as described above. Then, after a predetermined period of time lapses, similar to the previous steps, the rotation table 2 rotates by 60 degrees again in the counterclockwise direction, and the casting mold M reaches and stops at the position S4.

Just before the start of the rotation of the rotation table 2, similar to the rotation from the position S1 to the position S2, the shutter opening/closing cylinder 8 operates so as to raise the shutter 9. Subsequently, the concaved cut portion 77C of the spacer 77A is in an opened state, and the casting mold M passes through the spacer 77A. Just after the casting mold M passes through the spacer 77A and the rotation of the rotation table 2 ends, the shutter opening/closing cylinder 8 operates to lower the shutter 9 so as to close the concaved cut portion 77C of the spacer 77A.

In the position S4, the casting mold M is gradually cooled at a desired temperature by circulating air supplied from the supplying slot 79A formed in the outer circumferential side surface portion 73. The temperature of the air is maintained by means of a heater which is controlled by the output from the second temperature adjusting portion 11. Subsequently, after a predetermined period of time lapses, the rotation table 2 rotates by 60 degrees again in the counterclockwise direction, similar to the rotation in the previous step, and the casting mold M reaches and stops at the position S5.

In the position S5, similar to the position S4, the casting mold M is gradually cooled at a desired temperature by supplying and circulating air controlled at a desired temperature by the second temperature adjusting portion 11.

Subsequently, after a predetermined period of time lapses, the rotation table 2 rotates by 60 degrees again in the counterclockwise direction similar to the rotation performed in the previous step, and the casting mold M reaches and stops at the position S6.

In the position S6, the casting mold M is gradually cooled at a desired temperature by supplying and circulating air controlled at a desired temperature by the second temperature adjusting portion 11 similar to how it is controlled in the positions S4 and S5. Subsequently, after a predetermined period of time lapses, the rotation table 2 rotates by 60 degrees in the counterclockwise direction again similar to the previous rotational steps, and the casting mold M reaches and stops at the position S1 again.

At the time of starting the rotation of the rotation table 2, similar to the rotation from the position S1 to the position S2, the shutter opening/closing cylinder 8 operates so as to raise the shutter 9, resulting in the concaved cut portion 78C of the spacer 78A being in an opened state, and the casting mold M passing through the spacer 78A. After the casting mold M passes through the spacer 78A, the shutter opening/closing cylinder 8 operates so as to lower the shutter 9, thereby, closing the concaved cut portion 77C of the spacer 78A.

Subsequently, in the position S1, the casting mold M is removed by the operator. After the processed casting mold M is removed, another casting mold M is supplied to the glass plate 21 at the position S1.

These operations relate to the case of processing one casting mold M, but actually the casting molds M are supplied consecutively or at an arbitrary timing. Thus, the shutter 9 rises every time just before the start of rotation of the rotation table 2 and lowers or drops just after the rotation end.

The counterclockwise rotation of the rotation table 2 by 60 degrees for one position described above is controlled by the controller 4 in a cycle time of, for example, a total of about 90 seconds, where 5 seconds is for the rotation driving time and 85 seconds are for the stop time. Accordingly, the time for supplying and removing the casting mold M is set to about 90 seconds, the time for irradiating the ultraviolet rays onto the casting mold M is set to about 3 minutes, and the time for gradually cooling the casting mold M is set to about 4 minutes and 30 seconds.

According to the operation of the device for manufacturing the plastic lens, in the active-energy-ray irradiating area A2 surrounded by the spacers 76A and 76B, the spacers 77A and 77B, and the outer circumferential side surface portion 73, the circulating air supplied from the supplying slot 79A and the discharging slot 79B, the temperature of which is controlled by the first temperature adjusting portion 10 in order to uniformly maintain the temperature of the casting mold M. The temperature of the circulating air is different according to the plastic composition injected into the casting mold M. The controlled temperature of the hot air, which is supplied to the casting mold M during curing, however, should be in the range of about 80 to 120° C. That is, the active-energy-ray irradiating area A2 is a surrounded area forming a chamber to irradiate the ultraviolet rays onto the casting mold M and to prevent the ultraviolet rays and the hot air from leaking.

In the gradually cooling area A3 surrounded by the spacers 77A and 77B, the spacers 78A and 78B, and the outer circumferential side surface portion 73, the second temperature adjusting portion 11 supplies the circulating air from the supplying slot 79A and the discharging slot 79B. The temperature of the circulating air is controlled in order to gradually cool the casting mold M. The temperature of the circulating air supplied to the casting mold M should be maintained in a range of approximately 50 to 90° C., because if the casting mold M is rapidly cooled, the molds 120 and 121 of the casting mold M and the plastic composition (the plastic lens or the lens forming composition) 123 are separated.

That is, the cooling area A3 is a surrounded area forming a chamber so as to gradually cool the casting mold M and to prevent the hot air from leaking.

Moreover, in a natural cooling, the cooling speed is changed according to the type and/or the volume of the plastic composition injected into the casting mold M, which results in causing a variation in the power of the polymerized plastic lens. Meanwhile, in the exemplary embodiment of the present invention, by blowing the hot air, the temperature of which is controlled, onto the casting mold M, it is possible to prevent the decrease of the yield productivity due to the variation in the power of the plastic lens.

As described above, with the device for manufacturing the plastic lens according to the illustrative, non-limiting embodiment of the present invention, the following advantages can be obtained:

(1) Since the plastic lens can be manufactured with one rotation of the rotation table 2, when the casting mold M injected with the plastic composition is loaded on the rotation table 2, it is possible to provide a compact device for manufacturing the plastic lens. Further, since the supplying portion and the removing portion of the casting mold are disposed at the same position, the operator need not travel from the supply portion to the discharge portion, thereby the travel time can be reduced. In addition, it is possible to maintain the intensity of irradiation reaching the casting mold constant since the irradiation reaching the casting mold is not lowered because of dust particles from the transferring conveyer. As a result, it is possible to provide a highly efficient device for manufacturing the plastic lens.

(2) Since the hot air supplied onto the casting mold M has its temperature controlled by the first temperature adjusting portion 10 and the second temperature adjusting portion 11, it is possible to provide the device for manufacturing the plastic lens which can prevent the decrease of the yield productivity due to the premature separation of the plastic composition injected into the casting mold from the casting mold.

(3) Since the rotation table 2 intermittently rotates in a desired cycle time and a desired amount of rotation in which one rotation of the rotation axis 32 is divided into a desired number by controlling the controller 4, it is possible to manufacture the plastic lenses from various plastic lens compositions. Besides, in the active-energy-ray irradiating portion, the active energy rays are irradiated onto the casting mold in the state in which the casting mold injected with the plastic lens composition therein stops, such that it is possible to obtain the plastic lens having the suitable polymer quality.

(4) Since closed areas or chambers are formed by the spacers 76A to 78A and 76B to 78B and shutter 9 (separating means), it is possible to prevent the leakage of the ultraviolet rays (active energy rays) to be irradiated onto the casting mold M injected with the plastic composition or the leakage of the hot air the temperature of which is controlled by the respective temperature adjusting portion. Thus, it is possible to obtain the plastic lens having the suitable polymer quality. At the same time, at the time of the supply or the removal of the casting mold M, it is possible to shield the operator from exposure to diffusively reflected ultraviolet rays and/or hot air.

(5) The position at which the casting mold M stops in the active-energy-ray irradiating area A2 is located at a position in which the center of the casting mold M and the axis lines of the ultraviolet lamps 51 and 61 approximately intersect. Thus, the ultraviolet rays are uniformly irradiated from the center of the casting mold M. As a result, it is possible to obtain the plastic lens having the polymer quality with no inside distortion.

(6) The casting mold M loaded on the rotation table 2 is irradiated by the ultraviolet rays in the state in which the direction of the casting mold M is changed with respect to the longitudinal axis directions of the ultraviolet lamps 51 and 61 when the rotation table 2 rotates. Alternatively, the positions at which the casting mold M stops in the active-energy-ray irradiating area A2 are set to two positions (if necessary, two or more positions can be set). Thus, since the ultraviolet rays are irradiated on the casting mold M at different directions, it is possible to obtain the plastic lens having the polymer quality with no inside distortion.

(7) According to the device for manufacturing the plastic lens of the exemplary embodiment of the present invention, the composition to be polymerized is a plastic lens composition made of two or more polymer compound. Thus, it is possible to obtain the plastic lens having the suitable polymer quality using the active energy rays (ultraviolet rays).

The exemplary embodiment of the present invention may be changed and modified as follows.

The rotation table 2 described above in which six glass plates 21 are formed at planar positions every 60 degrees on the concentric circle of the rotation center of the rotation table 2 in which the rotation center is divided into six areas and the servo motor 3 drives the rotation table 2 in the counterclockwise direction by 60 degrees and in which one rotation of the rotation axis 32 (the rotation table 2) is divided into six. However, the division number of the rotation table 2 (the provision number of the glass plates 21), the division number of one rotation of the rotation axis 32, or the rotation direction of the rotation table 2 may be arbitrarily set by a desired time cycle in consideration of the desired size or the production ability of the manufacturing device.

In the exemplary first embodiment of the present invention, the ultraviolet rays were used as the active energy rays. Other variations are possible, however. For example, other active energy rays such as known X-rays, electron rays, or visible rays may also be used. As the light source, known chemical lamps, xenon lamps, low-pressure mercury lamps, high-pressure mercury lamps, metal halide lamps, fusion lamps, or the like may be used.

In the exemplary embodiment, the active-energy-ray irradiating area A2 for irradiating the ultraviolet rays is arranged at an area over two positions including the positions S2 and S3, and the longitudinal axis-shaped ultraviolet irradiating devices 5 and 6 for simultaneously irradiating the ultraviolet rays onto two positions S2 and S3 are used in the respective positions. However, other variations are possible. For example, the ultraviolet irradiating device may separately be provided at every position. For example, when the active-energy-ray irradiating area includes three or more positions, it is preferable to provide separate ultraviolet irradiating devices at these positions so as to obtain a uniform intensity of irradiation by aligning the center of the casting mold to which the ultraviolet rays are irradiated and the center of the ultraviolet lamp.

The plastic composition is a plastic lens composition made of two or more polymer compounds and has a single functional or multi-functional reactive group. Thus, only if any compounds have one or two or more radical polymerizable double bonds in molecules, it may be used for the plastic composition.

The above description of an illustrative, non-limiting embodiment and its variations has been given by way of an example. The above and other features of the invention including various novel method steps and a device of the various novel components have been particularly described with reference to the accompanying drawings and pointed out in the claims. It will be understood that the particular process and construction of parts embodying the invention is shown by way of illustration only and not as a limitation of the invention. The principles and features of this invention may be employed in varied and numerous embodiments without departing from the scope of the invention as defined by the appended claims and equivalents thereof.

What is claimed is:

1. A device for manufacturing a plastic lens by irradiating active energy rays onto a casting mold injected with plastic composition to polymerize the plastic composition, the device comprising:
    a rotary table for transferring a plurality of casting molds in a circular manner:
    a driving means for rotatively driving a rotation axis of the rotary table:
    an irradiating portion irradiating the active energy rays in a predetermined angular range onto at least one casting mold when the casting mold loaded on the rotary table is rotated once;

a control means for controlling the driving means to irradiate the active energy rays from the irradiating portion onto the at least one casting mold for a predetermined period of time;

a supplying/removing portion for supplying and removing the at least one casting mold to and from the rotary table;

a first temperature adjusting portion for controlling the temperature of the irradiating portion;

a cooling portion for gradually cooling the at least one irradiated casting mold;

a second temperature adjusting portion for controlling temperature of the cooling portion; and separating means for separating atmospheres formed in the supplying/removing portion, the irradiating portion, and the cooling portion when the rotation of the rotary table is stopped, wherein the supplying/removing portion, the irradiating portion, and the cooling portion are sequentially arranged in a circular fashion, in a direction of rotation of the rotation axis of the rotary table in a vicinity of the rotation axis.

2. The device for manufacturing a plastic lens according to claim 1, wherein the control means controls the driving means, intermittently rotating the rotary table at a cycle time, and wherein the control means secures a predetermined stop time by controlling the driving means to execute a predetermined amount of rotation, the predetermined amount of rotation is obtained by dividing one rotation of the rotary table into a predetermined number.

3. The device for manufacturing a plastic lens according to claim 2, wherein the irradiating portion comprises an irradiation area having a size sufficient to stop the casting mold on the rotary table in the irradiation area at least twice.

4. The device for manufacturing a plastic lens according to claim 1, wherein the irradiating portion comprises an ultraviolet lamp irradiating ultraviolet rays serving as the active energy rays.

5. The device for manufacturing a plastic lens according to claim 1, wherein the irradiating portion comprises at least a pair of active-energy-ray lamps at upper and lower sides of the rotary table, with the rotary table interposed therebetween, and wherein the rotary table has a transmitting member in at least one load position of the casting mold for transmitting the active energy rays irradiated from the active-energy-ray lamp arranged at the lower side.

6. The device for manufacturing a plastic lens according to claim 1, wherein the plastic composition is a plastic lens forming composition made of at least two polymer compounds.

7. The device for manufacturing a plastic lens according to claim 1, wherein each of said supplying/removing portion, irradiating portion, and the cooling portion form a separate chamber isolated by spacers provided between said each portion of the rotary table.

8. The device for manufacturing a plastic lens according to claim 7, wherein when the driving means rotates the rotary table a shutter provided in each of said spacers is raised to create an opening for the casting mold to pass to a next portion of the rotary table.

9. The device for manufacturing a plastic lens according to claim 7, wherein each of the casting molds is cured at least twice in said irradiating portion, and wherein each of the casting molds is cured by the active energy rays of a first intensity when placed in a first position in the irradiating portion, and by the active energy rays of a second intensity when placed in a second stop position in the irradiating portion.

10. The device for manufacturing a plastic lens according to claim 9, wherein during said curing hot air is circulated in the irradiation portion and during said gradual cooling hot air is circulated in the cooling portion, and wherein a temperature of the hot air in the irradiation portion is in a range of approximately 80 to 120° C. and a temperature of the hot air in the cooling portion is in a range of approximately 50 to 900° C.

11. The device for manufacturing a plastic lens according to claim 9, wherein for each position of said first position and said second position, a separate irradiating device is provided obtaining a relatively uniform intensity of irradiation by aligning a center of the casting mold with the center of said irradiating device.

12. A device for manufacturing a plastic lens by irradiating active energy rays onto a casting mold injected with a plastic composition to polymerize the plastic composition, the device comprising:

a rotary table for transferring a plurality of casting molds in a circular manner;

a driving means for rotatively driving a rotation axis of the rotary table;

an irradiating portion irradiating the active energy rays in a predetermined angular range onto at least one casting mold when the casting mold loaded on the rotary table is rotated once;

a control means for controlling the driving means to irradiate the active energy rays from the irradiating portion onto the at least one casting mold for a predetermined period of time;

a supplying/removing portion for supplying and removing the at least one casting mold to and from the rotary table;

a first temperature adjusting portion for controlling the temperature of the irradiating portion;

a cooling portion for gradually cooling the at least one irradiated casting mold;

a second temperature adjusting portion for controlling temperature of the cooling portion; and separating means for separating atmospheres formed in the supplying/removing portion, the irradiating portion, and the cooling portion when the rotation of the rotary table is stopped, wherein the supplying/removing portion, the irradiating portion, and the cooling portion are sequentially arranged in a circular fashion, in a direction of rotation of the rotation axis of the rotary table in a vicinity of the rotation axis.

13. A device for manufacturing a plastic lens by irradiating active energy rays onto a casting mold injected with a plastic composition to polymerize the plastic composition, the device comprising:

a rotary table for transferring a plurality of casting molds in a circular manner;

a driving means for rotatively driving a rotation axis of the rotary table;

an irradiating portion irradiating the active energy rays in a predetermined angular range onto at least one casting mold when the casting mold loaded on the rotary table is rotated once;

a control means for controlling the driving means to irradiate the active energy rays from the irradiating portion onto the at least one casting mold for a predetermined period of time;

a supplying/removing portion for supplying and removing the at least one casting mold to and from the rotary table;

a first temperature adjusting portion for controlling the temperature of the irradiating portion;

a cooling portion for gradually cooling the at least one irradiated casting mold; and a second temperature adjusting portion for controlling temperature of the cooling portion, wherein the supplying/removing portion, the irradiating portion, and the cooling portion are sequentially arranged in a circular fashion, in a direction of rotation of the rotation axis of the rotary table in a vicinity of the rotation axis, and wherein each of said supplying/removing portion, irradiating portion, and the cooling portion form a separate chamber isolated by spacers provided between said each portion of the rotary table.

14. The device for manufacturing plastic lens according to claim 1, further comprising at least one concave shaped separator separating at least one of the supplying/removing portion, the irradiation portion, and the cooling portion.

15. The device for manufacturing a plastic lens according to claim 14, further comprising a shutter adjacent to the separator, wherein the shutter opens and closes.

16. A method of manufacturing a plastic lens by irradiating active energy rays onto a casting mold injected with a plastic composition to polymerize the plastic composition, the method comprising:

transferring a plurality of casting molds on a rotary table in a circular manner;

rotatively driving a rotation axis of the rotary table;

irradiating the active energy rays in a predetermined angular range onto at least one casting mold when the casting mold loaded on the rotary table is rotated once; and controlling the driving to irradiate the active energy rays onto the at least one casting mold for a predetermined period of time, wherein said irradiating comprises an ultraviolet lamp irradiating the casting mold when the casting mold is stopped in a position in which an axis line of the ultraviolet lamp approximately intersects a center of the casting mold.

* * * * *